United States Patent
Ezaki et al.

(10) Patent No.: US 8,243,858 B2
(45) Date of Patent: Aug. 14, 2012

(54) RECEIVER AND METHOD FOR RECEIVING

(75) Inventors: Takato Ezaki, Kawasaki (JP); Dai Kimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 51 days.

(21) Appl. No.: 13/028,546

(22) Filed: Feb. 16, 2011

(65) Prior Publication Data

US 2011/0135041 A1 Jun. 9, 2011

Related U.S. Application Data

(63) Continuation of application No. PCT/JP2008/064893, filed on Aug. 21, 2008.

(51) Int. Cl.
*H04B 1/16* (2006.01)
(52) U.S. Cl. .................................................. 375/340
(58) Field of Classification Search .......... 375/340, 375/341, 344, 347
See application file for complete search history.

(56) References Cited

U.S. PATENT DOCUMENTS

| | | | | |
|---|---|---|---|---|
| 5,917,864 | A * | 6/1999 | Asahara | 375/344 |
| 5,923,679 | A * | 7/1999 | Itoh et al. | 714/752 |
| 7,590,199 | B2 * | 9/2009 | Alagha | 375/347 |
| 2005/0031054 | A1 * | 2/2005 | Horisaki | 375/341 |
| 2007/0047470 | A1 * | 3/2007 | Okabe | 370/255 |

FOREIGN PATENT DOCUMENTS

| | | |
|---|---|---|
| EP | 0 942 565 | 9/1999 |
| JP | 7-202964 | 8/1995 |
| JP | 7-321769 | 12/1995 |
| JP | 9-116440 | 5/1997 |
| JP | 10-190758 | 7/1998 |
| JP | 11-261458 | 9/1999 |
| JP | 11-340897 | 12/1999 |
| JP | 2004-128877 | 4/2004 |
| JP | 2004-194021 | 7/2004 |
| JP | 2005-57670 | 3/2005 |
| JP | 2005-309772 | 11/2005 |
| JP | 2005-316878 | 11/2005 |
| JP | 2006-295549 | 10/2006 |
| JP | 2007-66125 | 3/2007 |

OTHER PUBLICATIONS

International Search Report dated Oct. 7, 2008, from the corresponding International Application.
Paul H. Moose. "A Technique for Orthogonal Frequency Division Multiplexing Frequency Offset Correction" IEEE Transactions on Communications, vol. 42, No. 10, Oct. 1994.
Michele Morelli et al. "An Improved Frequency Offset Estimator for OFDM Applications" IEEE Communications Letters, vol. 3, No. 3, Mar. 1999.

(Continued)

*Primary Examiner* — Jaison Joseph
(74) *Attorney, Agent, or Firm* — Katten Muchin Rosenman LLP

(57) ABSTRACT

A procedure of receiving includes estimating a phase offset of a received signal and calculating one or more phase offsets which result in the estimated phase offset of the received signal and which have different phase rotation directions and/or different phase rotation amounts from one another; compensating for the phase offset of the received signal, using each of a plurality of phase offsets that are the estimated phase offset and the calculated phase offsets, and demodulating and decoding the plurality of compensated received signals; and selecting a decoding result that is the most likely to be the received signal among a plurality of results of the decoding corresponding one for each of the plurality of phase offsets.

9 Claims, 16 Drawing Sheets

OTHER PUBLICATIONS

Hyunsoo Cheon. "Frequency Offset Estimation for High Speed Users in E-UTRA Uplink" The 18th Annual IEEE International Symposium on Personal, Indoor and Mobile Radio Communication (PIMRC '07), Sep. 2007.

Notification of Reasons for Refusal dated Sep. 20, 2011, from corresponding Japanese Application No. 2010-525528.

* cited by examiner

RECEIVER AND METHOD FOR RECEIVING

CROSS-REFERENCE TO RELATED APPLICATION

This application is a continuation application of a PCT international application No. PCT/JP2008/064893 filed on Aug. 21, 2008 in Japan, the entire contents of which are incorporated by reference.

FIELD

The embodiment discussed herein is a receiver and a method for receiving, and is applicable to a technique that estimates a frequency (phase) offset of a received signal and compensates for the frequency offset.

BACKGROUND

In a wireless communication system, there is a possibility of occurrence of a frequency offset due to Doppler effect while the user terminal (mobile station) is traveling at a high speed wirelessly communicates with a wireless base station (hereinafter simply called "base station"), for example, a user in SHINKANSEN uses a cell phone. Such a frequency offset may largely affects a quality of receiving signals at a user terminal.

For example, in communication between a user terminal serving as a receiver and a base station serving as a transmitter that are in line of site (LOS) through the use of a direct wave, a Doppler frequency appears in the form of a frequency offset of a received signal, and the offset is observed to be an amount of phase rotation on the baseband signal.

Such a frequency offset can be eliminated by an AFC (Automatic Frequency Control) circuit included in the receiver. An AFC circuit estimates a frequency offset (an amount of phase rotation) with reference to a received signal, and provides an amount of phase rotation in the reverse direction of the estimated amount of phase rotation so that the frequency offset can be eliminated.

One of the known methods of estimating a frequency offset uses a signal, called a pilot signal and a reference signal, commonly known to both receiver and transmitter. For example, as illustrated in FIG. 15, there is a known method in which an amount of phase rotation is estimated on the basis of correlation value of reference signals received at different timings.

The range of an estimatable frequency in this method of estimating depends on the cycle (intervals) of transmitting the reference signal. For example, estimating a large frequency offset caused from a Doppler frequency during high-speed traveling requires the reference signal to be transmitted at a shorter cycle.

[Non-Patent Literature 1] p. Moose, "A Technique for Orthogonal Frequency Division Multiplexing Frequency Offset Correction", IEEE Trans. Commun., vol. 42, no. 10, October 1994

[Non-Patent Literature 2] M. Morelli and U. Mengali, "An Improved Frequency Offset Estimator for OFDM Applications", IEEE Commun. Lett., vol. 3, no. 3, March 1999

[Non-Patent Literature 3] H. Cheon, "Frequency Offset Estimation for High Speed Users in E-UTRA UPLINK", Proc. PIMRC 2007

In the base station, a downlink (DL) carrier frequency fc obtained by correction in the AFC circuit of a user terminal, serving as the receiver, is followed by an uplink (UL) carrier frequency fc+fu. The term "fu" represents an amount of an offset between the UL and the DL carrier frequencies.

For the above, on an UL signal received by the base station, twice 2df the one-way Doppler shift df for the DL and the UL is superimposed (see FIG. 14). Accordingly, the base station receives a signal containing a doubled frequency offset 2fd corresponding to the traveling speed of the user terminal (receiver).

This requires the base station to have a capability of estimating a frequency offset in a wide range and removing the estimated offset. However, in conventional techniques, the range of an estimatable (compensatable) frequency offset (phase rotation) depends on the cycle (intervals) of transmitting a known signal, such as the reference signal, and is therefore limited.

SUMMARY

For example, there is provided a receiver including a phase offset estimating section that estimates a phase offset of a received signal and that calculates one or more phase offsets which result in the estimated phase offset of the received signal and which have different phase rotation directions and/or different amounts of phase rotation from one another; a receiving processing section that compensates for the phase offset of the received signal, using each of a plurality of phase offsets that are the estimated phase offset and the calculated phase offsets, and that demodulates and decodes the plurality of compensated received signals; and a decoding result selecting section that selects a decoding result that is the most likely to be the received signal among a plurality of results of the decoding corresponding one for each of the plurality of phase offsets.

There is also provided a method for receiving comprising: estimating a phase offset of a received signal and calculating one or more phase offsets which result in the estimated phase offset of the received signal and which have different phase rotation directions and/or different phase rotation amounts from one another; compensating for the phase offset of the received signal, using each of a plurality of phase offsets that are the estimated phase offset and the calculated phase offsets, and demodulating and decoding the plurality of compensated received signals; and selecting a decoding result that is the most likely to be the received signal among a plurality of results of the decoding corresponding one for each of the plurality of phase offsets.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Hereinafter, description will now be made in relation to embodiment and modifications with reference to accompanying drawings. However, the embodiment and modifications to be detailed below are merely example, so there is no intention of excluding another embodiments and variations and application of techniques that are not mentioned in this specification. In other words, various changes and modifications (e.g., combination of the embodiments and the modifications) can be suggested without departing from the spirit the embodiments.

(1) First Embodiment

Figure 16:
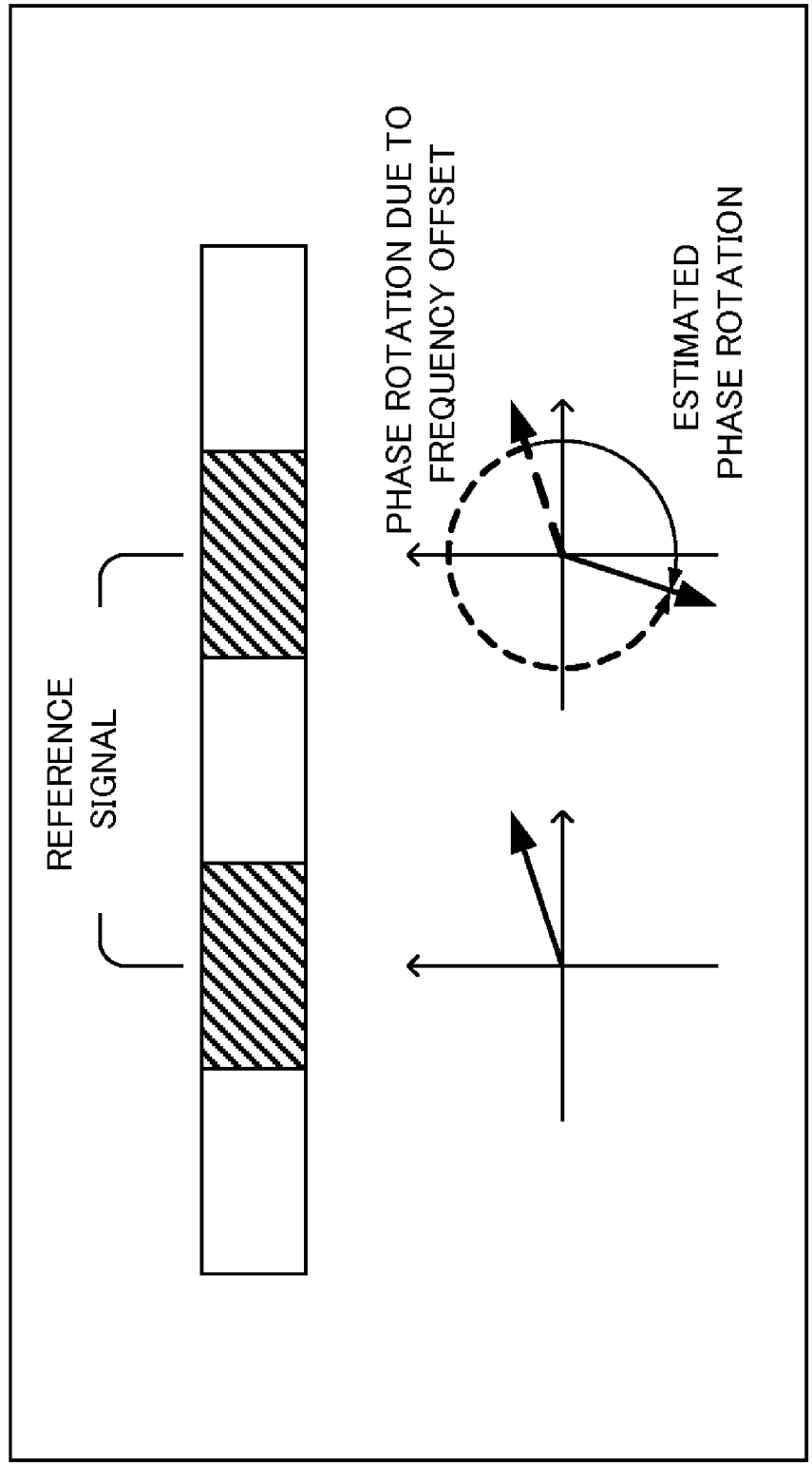
FIG. 16 A diagram illustrating a possible error in estimating in the method of FIG. 15.

In estimating a phase offset (or frequency offset) based on the correlation value between known signals received at different timings as the above, input of a received signal related to reference signals having a large amount of phase rotation, specifically having an amount of phase rotation in excess of ±180° as illustrated in the example of FIG. 16, into a phase offset estimating circuit causes an estimation error. Namely, the phase offset estimating circuit erroneously estimates the direction of the phase rotation to be the reverse direction of the true direction. For example, through the true amount of phase rotation is +210°, the circuit erroneously estimates the amount of phase rotation to be −150°. The term "phase offset (or frequency offset)" represents a difference (offset) from a predetermined value (reference frequency signal), and specifically in the embodiments herein, is used a concept having a direction of phase rotation (i.e., the direction of offset in frequency) and a largeness of the phase rotation (i.e., amount of phase rotation).

In the event of such erroneous estimation, compensation by cancelling the phase rotation erroneously estimated enlarges the phase rotation, resulting in remarkably worsening the quality of reception.

In wireless communication with a user (mobile terminal) in SHINKANSEN traveling at the speed of several hundreds kilometers per hour, there is a possibility of inputting receiving signal related to reference signal having a phase offset exceeding ±180° into the base station.

Figure 1:
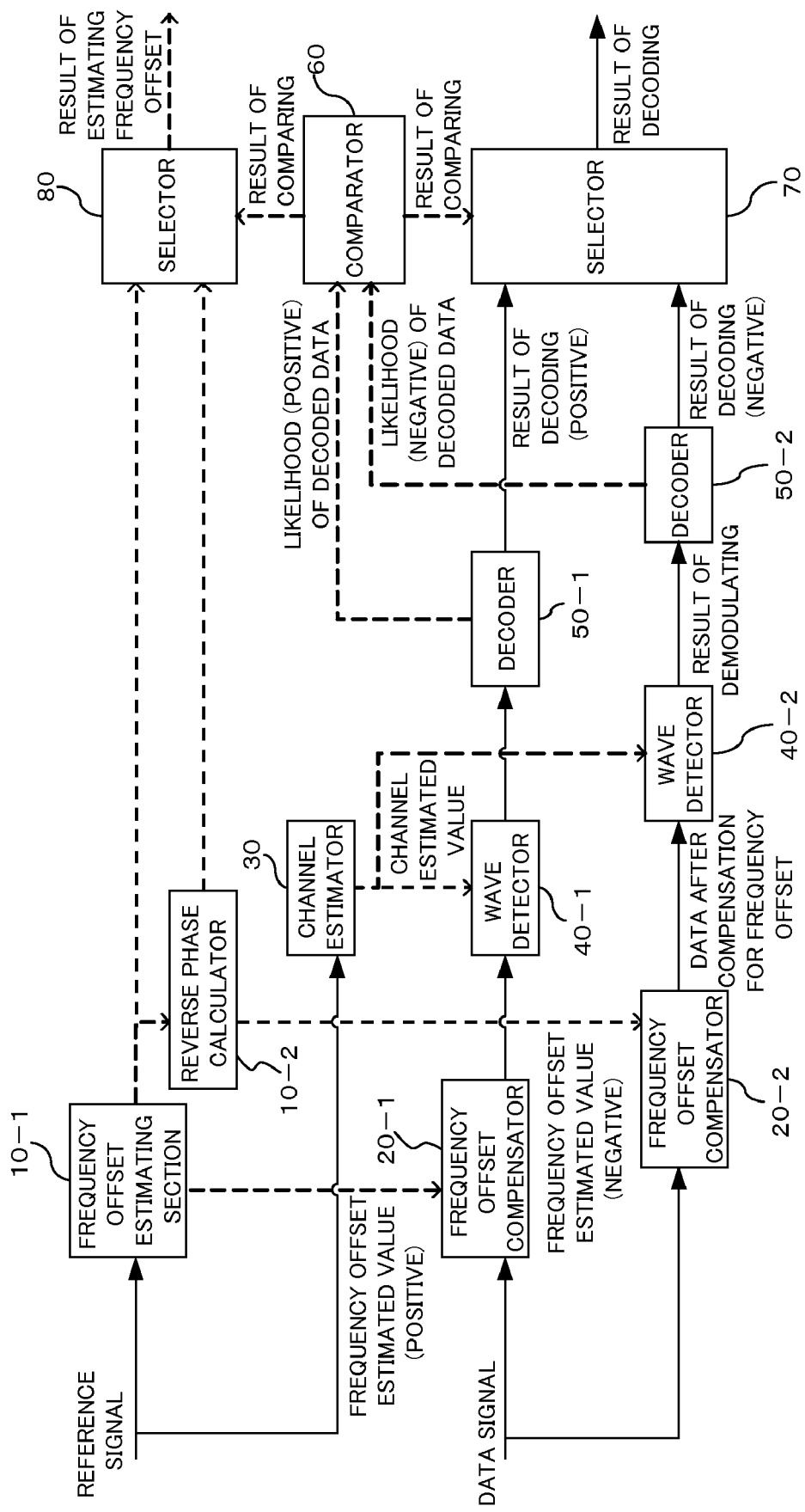
FIG. 1 A block diagram schematically illustrating an example of the configuration of a receiver according to a first embodiment.

In the foregoing problems in view, the embodiment discussed herein proposes a method of enlarging the range of an estimatable a frequency offset independently of a cycle of transmitting a reference signal. FIG. 1 illustrates an example of the configuration of an example of the configuration of a receiver according to a first embodiment. The receiver of FIG. 1 can be used for a receiving system of a base station, for example.

As illustrated in FIG. 1, the receiver of the first embodiment exemplarily includes a frequency offset estimating section 10-1, a reverse phase calculator 10-2, frequency offset compensators 20-1 and 20-2, a channel estimator 30, wave detectors 40-1 and 40-2, decoders 50-1 and 50-2, a comparator 60, and selectors 70 and 80. Into the frequency offset estimating section 10-1 and the channel estimator 30, reference signals received from a transmitter (e.g., a user terminal) are input. Into the frequency offset compensators 20-1 and 20-2, data signals received from the same transmitter are input. The reference signals and the data signals are obtained through dividing a received signal divided for each user terminal.

The frequency offset estimating section 10-1 estimates a frequency (phase) offset based on the time correlation value of the same signal (e.g., reference signal) received at different timings. The same signal used for estimating a phase offset alternatively may be a cyclic prefix (also called guard interval) used in OFDM (Orthogonal Frequency Division Multiplexing) or OFDMA (Orthogonal Frequency Division Multiple Access) scheme. Further alternatively, signals that are not the same but are known can be used for cancelling the phase offset of a received signal, and therefore can be treated as the same signal.

Figure 2:
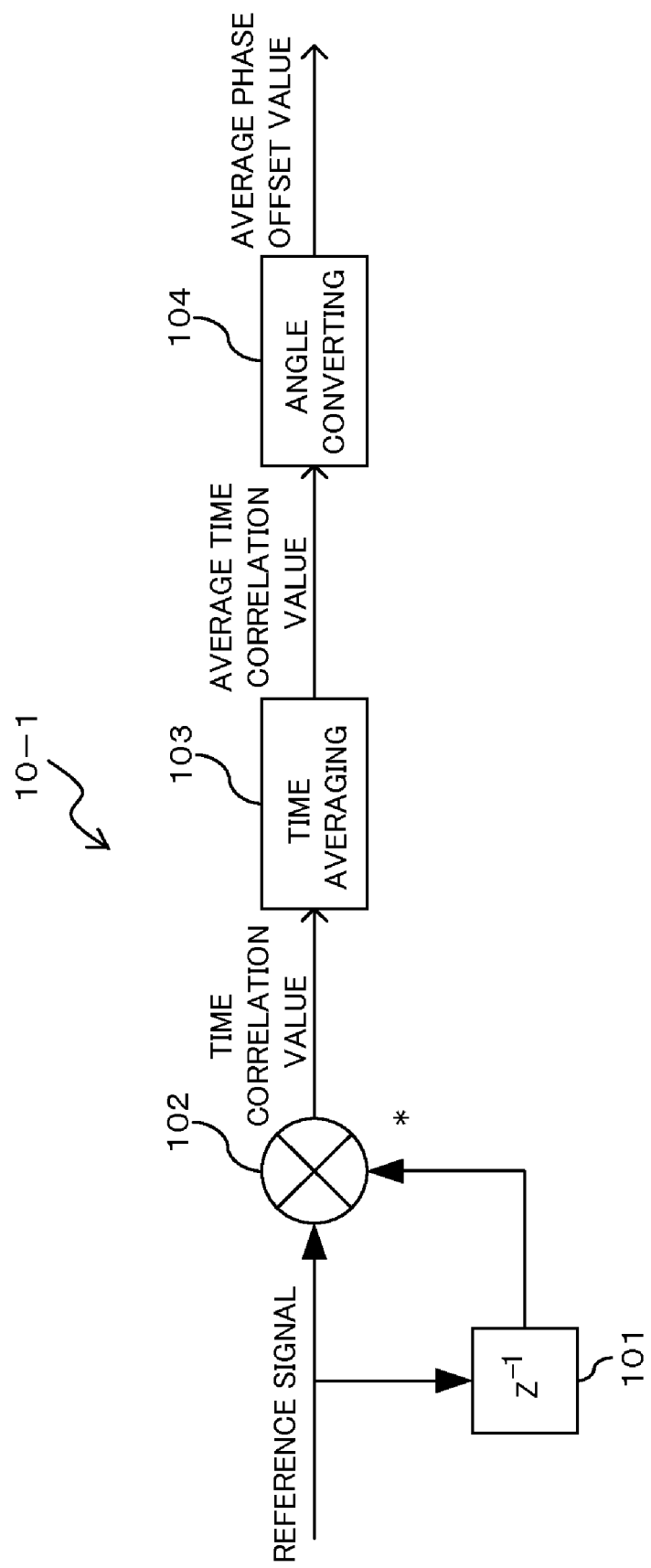
FIG. 2 A block diagram schematically illustrating an example of the configuration of a frequency offset estimating section of FIG. 1.

For the above, the frequency offset estimating section 10-1 includes, for example, a delay circuit 101, a multiplexer 102, a time averaging section 103, and an angle converting section 104 as illustrated in FIG. 2.

The delay circuit 101 delays an reference signal input into the frequency offset estimating section 10-1 for a predetermined time period according to the cycle of transmitting the reference signal. That inputs reference signals received at different times (timings) into the multiplexer 102.

The multiplexer 102 performs complex multiplexing on the reference signals received at different timings and thereby obtains a time correlation value of each reference signal.

The time averaging section 103 averages time correlation values obtained by the multiplexer 102 for a predetermined time period.

The angle converting section 104 converts the average correlation value averaged by the time averaging section 103 into a phase (frequency) offset (average). The estimated value of the frequency offset is sent to the frequency offset compensator 20-1.

The frequency offset compensator 20-1 compensates for the frequency offset of the received data signal using the estimated value of the frequency offset in the above manner.

The reverse phase calculator 10-2 calculates a phase offset ψ which provides the same amount of phase rotation as the phase offset φ estimated by the frequency offset estimating section 10-1 but which is in a reverse direction of that of the estimated phase offset φ. The calculated phase offset ψ is calculated by Formula (1) below. In Formula (1), sgn( ) represents a sign function. When φ≦0, sgn(φ)=+1; and when φ<0, sgn(φ)=−1.

$$\psi = \phi - 2\pi \times sgn(\phi) \quad (1)$$

Accordingly, when φ=−210°, ψ=150°. This calculates phase offsets each of which has a direction and an amount of phase rotation that result in an amount of phase rotation the same as the estimated phase offset φ even though the calculated phase offsets may be false (in other words, irrespective of truth of each calculated phase offset). However, this makes it possible to estimate a phase rotation between received reference signals in the range of ±360°. The phase offset ψ obtained by Formula (1) is input into the frequency offset compensator 20-2.

Namely, the frequency offset estimating sections 10-1 and the reverse phase calculator 10-2 of the first embodiment serves as one example of a phase offset estimating section which estimates a phase offset of a received signal and which calculates one or more phase offsets which result in the estimated phase offset of the received signal and which have different phase rotation directions and/or amounts of phase rotation from one another.

The frequency offset compensator 20-2 compensates for a phase offset of the received data signal, using the phase offset ψ provided from the reverse phase calculator 10-2.

The channel estimator 30 estimates a transmission path (i.e., channel) response between the transmitter and the receiver. A channel estimated value obtained by the channel estimator 30 is sent to both wave detectors 40-1 and 40-2.

The wave detector 40-1 detects (demodulates) the compensated received data subjected to the compensation for a frequency offset (the estimated phase offset φ) by the frequency offset compensator 20-1 on the basis of the channel estimated value provided by the channel estimator 30.

Similarly, the wave detector 40-2 detects (demodulates) the compensated received data subjected to the compensation for a frequency offset (the phase offset ψ) by the frequency offset compensator 20-2 on the basis of the channel estimated value provided by the channel estimator 30.

The results of demodulation by the wave detectors 40-1 and 40-2 are input into the decoders 50-1 and 50-2, respectively.

The decoders 50-1 and 50-2 decode the respective results of demodulation, and can be realized by error correction decoders. As a result of decoding, the decoders 50-1 and 50-2 obtain likelihood information (likelihood of decoded data). An example of applicable error correction code is Turbo code. The results of decoding in the decoders 50-1 and 50-2 are sent to the selector 70 and the likelihood information of the decoders 50-1 and 50-2 are sent to the comparator 60.

Namely, the combination of the compensators 20-1 and 20-2, the wave detectors 40-1 and 40-2, and the decoder 50-1 and 50-2 serves as one example of a receiving processing section that compensates for the phase offset of the received signal, using each of the estimated or calculated phase offsets obtained by the frequency offset estimating sections 10-1 and the reverse phase calculator 10-2, and that demodulates and decodes the compensated received signals.

The comparator 60 compares the likelihood information from the decoder 50-1 and that from the decoder 50-2 and thereby determines the likelihood information that provides a result of decoding more likely to be the received signal. In addition, on the basis of the result of the determination, the comparator 60 controls the selectors 70 and 80 such that the result of decoding and the frequency offset (φ or ψ) which are corresponding to the determined likelihood information are selectively output.

The selector (decoding result selecting section) 70 selectively outputs one of the outputs from the decoders 50-1 and 50-2 to be the result of decoding under the control of the comparator 60. Namely, the selector 70 selects one that is the most likely to be the received signal from a number of results of decoding corresponding one to each of the estimated or calculated phase offsets.

Under the control of the comparator 60, the selector (frequency offset estimating result selecting section) 80 selects one of the frequency offsets obtained by the frequency offset estimating section 10-1 and the reverse phase calculator 10-2 and outputs the selected offset. The selected frequency offset can be used for compensation for a frequency offset of each individual received signal received through a particular channel such as the data channel as will be detailed below. For this purpose, the information about the frequency offset selected by the selector 70 can be stored in a memory which does not however appear in the drawings. If there is no requirement for compensation for offset of each individual signal, the selector 80 may be omitted.

As described above, the frequency offset estimating section 10-1 and the reverse phase calculator 10-2 of the first embodiment estimate or calculate a number of calculated phase offsets, irrespective of being true or false, having different directions of phase rotation and/or different amounts of phase rotation on the basis of the reference signal, and carry out compensation of frequency offset, demodulation, and decoding on the received signal using each of the phase offsets. Then, the likelihoods of the results of decoding related to the estimated and the calculated phase offsets are compared and one estimated or calculated phase offset providing the most likely result of decoding from the estimated and the calculated phase offsets is selected as the correct frequency offset.

That makes it possible to estimate a phase offset between received reference signals in a range of ±360°, which means that the range of an estimatable frequency offset can be doubled as compared to a conventional technique. Accordingly, even if a received data signal has a phase offset exceeding the range (i.e., ±180°), which can be estimated through the use of the reference signal, the received data signal can be appropriately demodulated and decoded.

The first embodiment carries out compensation for a frequency compensation, detection (demodulation), and decoding in parallel with one another. Alternatively these may be carried out in time series (in time-divisional manner). For example, a single frequency offset compensator, a single wave detector, and a single decoder are shared by the frequency offset estimating section 10-1 and the reverse phase calculator 10-2. With this configuration, during the first cycle (the first processing), a frequency offset (phase offset φ) obtained by the frequency offset estimating section 10-1 is subjected to the processing, and during the second cycle (the second processing), the frequency offset (phase offset ψ) obtained by the reverse phase calculator 10-2 is subjected to the processing. This configuration can reduce the size of the receiver.

(2) First Modification

Figure 3:
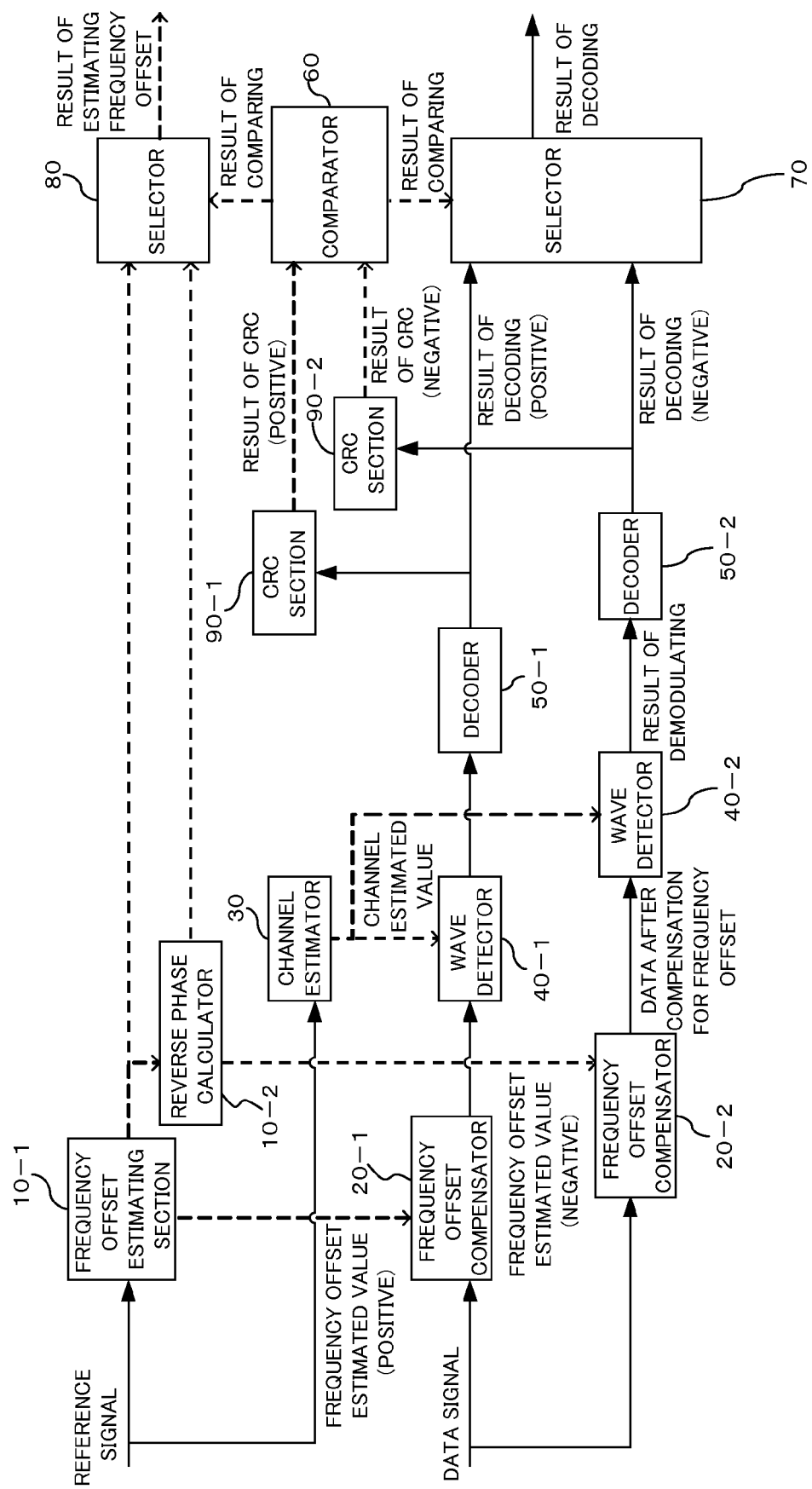
FIG. 3 A block diagram schematically illustrating an example of the configuration of a receiver according to a first modification.

FIG. 3 is a block diagram illustrating an example of the configuration of a receiver according to a first modification.

The receiver of FIG. 3 differs from that of FIG. 1 in the point that the comparison in the comparator 60 is based on, not the likelihood information, results of CRC (Cyclic Redundancy Check) of CRC sections 90-1 and 90-2.

Specifically, one CRC section 90-1 performs CRC on the result of decoding by the decoder 50-1 to determine the presence and the absence of an error in the result; and the other CRC section 90-2 performs CRC on the result of decoding by the other decoder 50-2 to determine the presence and the absence of an error in the result. The results of determination of the CRC sections 90-1 and 90-2 are input into the comparator 60.

The comparator 60 compares the results of the determination of the CRC sections 90-1 and 90-2; thereby determines (selects) one result containing no error or less errors; and controls the selectors 70 and 80 such that a result of decoding and a frequency offset ($\phi$ or $\psi$) corresponding to the determined results are output.

This selection of a result of decoding and the frequency offset based on results of CRC can obtain the correct result of estimating a frequency offset in a range where a result of CRC is reliable.

(3) Second Modification

Figure 4:
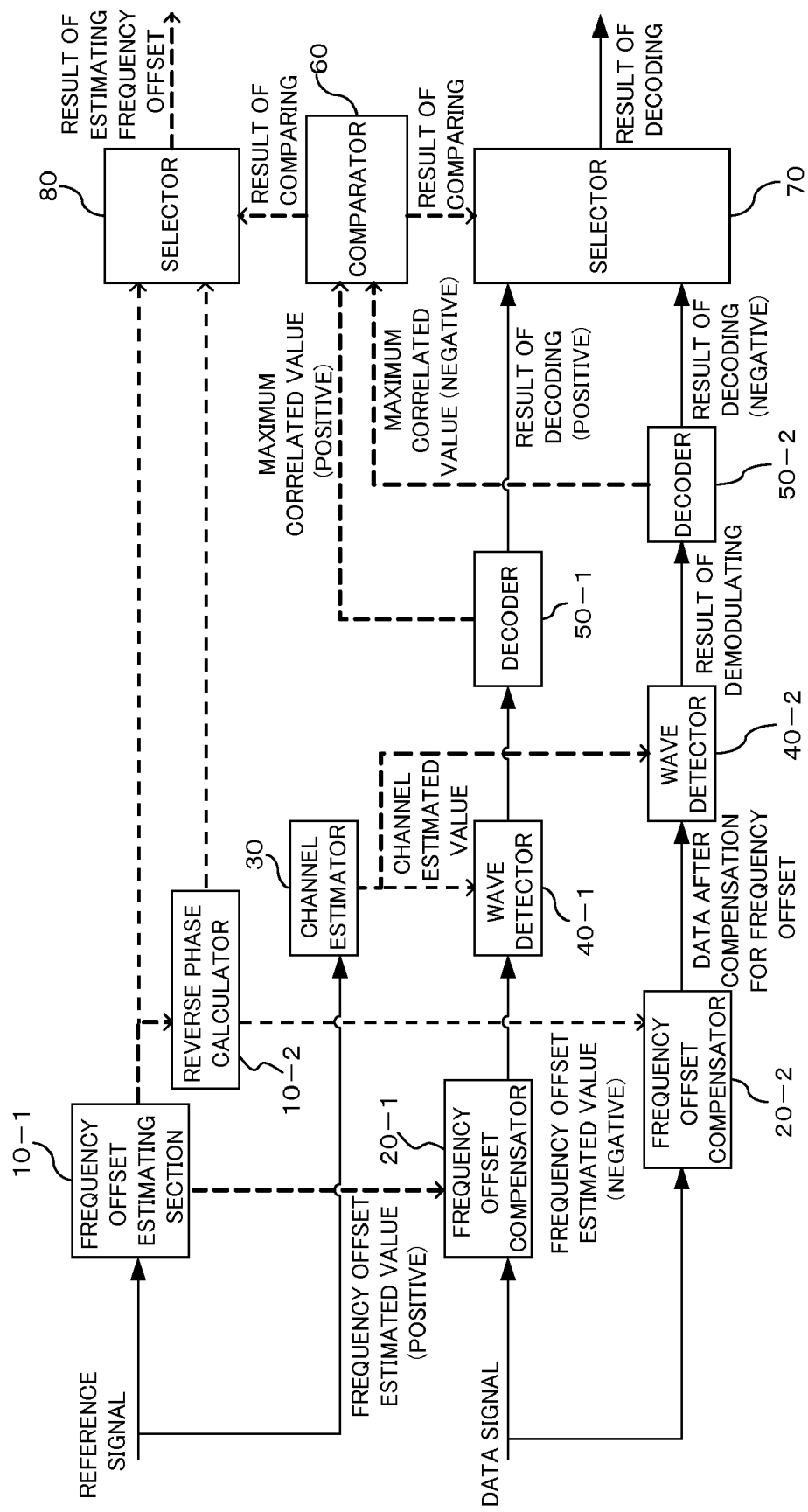
FIG. 4 A block diagram schematically illustrating an example of the configuration of a receiver according to a second modification.

FIG. 4 is a block diagram illustrating an example of the configuration of a receiver according to a second modification. The receiver of FIG. 4 differs from that of FIG. 1 in the point that the comparison in the comparator 60 is based on, as one of the example of the likelihood information, the maximum correlation value of the most likely decoding of the results of decoding by the decoders 50-1 and 50-2.

The term "most likely decoding" represents a method of decoding in which correlation values (conditional probability) of the received data with all the receivable code words are calculated and one code words having the maximum correlation (i.e., a data string having the highest probability) is selected as the result of decoding.

The comparator 60 compares the maximum correlation values input from the respective decoders 50-1 and 50-2, determines one maximum correlation value which provides a result of decoding more likely to the result of decoding the received data signal, and controls the selectors 70 and 80 such that a result of decoding and a frequency offset ($\phi$ or $\psi$) corresponding to the determined maximum correlation value are output.

The second modification ensures the same effects and advantages of the receiver illustrated in FIG. 1. Furthermore, a frequency offset can be estimated in the cases where the use of most likely decoding is suitable when, for example, the length of coding is short.

(4) Third Modification

Figure 5:
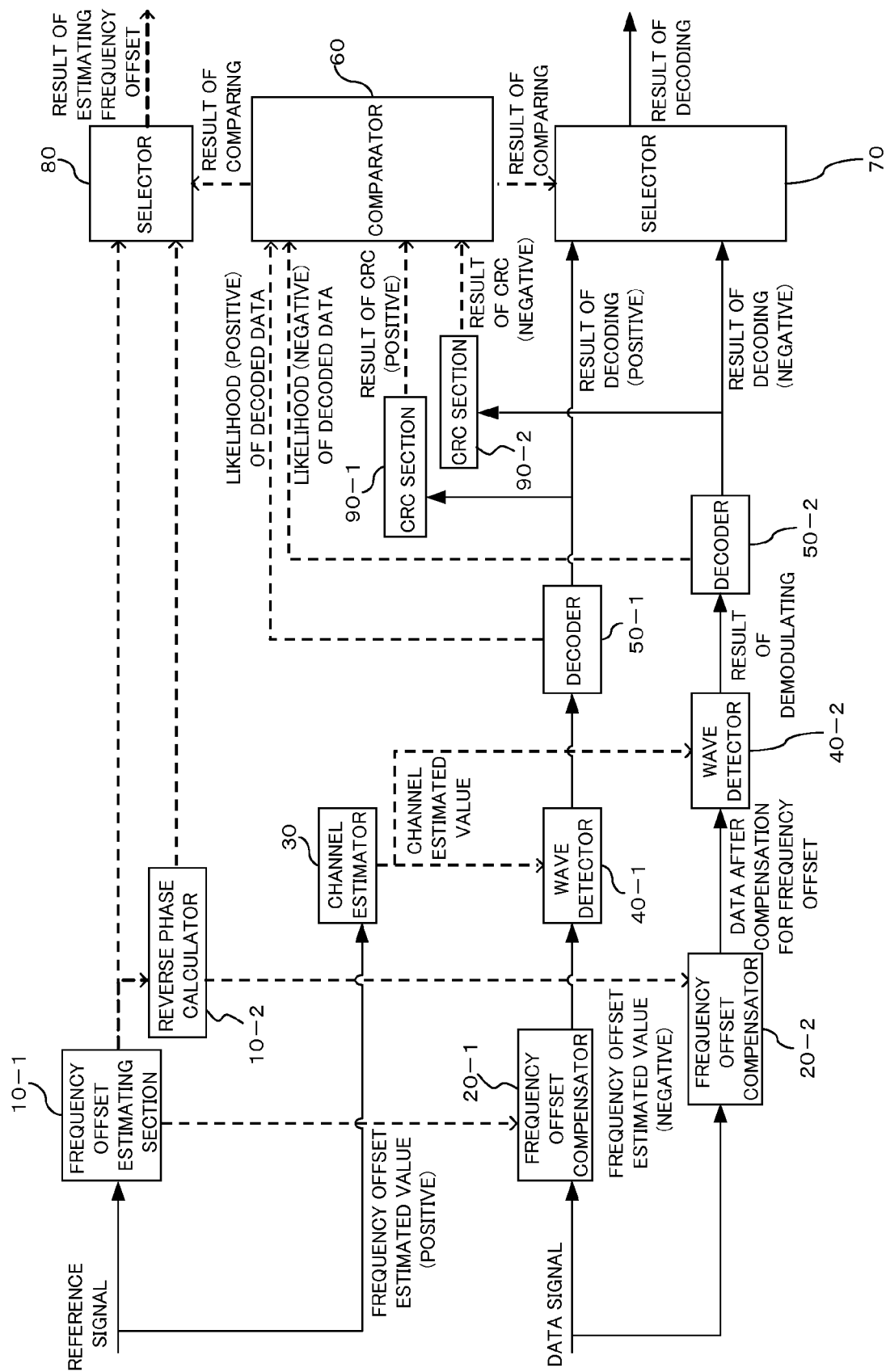
FIG. 5 A block diagram schematically illustrating an example of the configuration of a receiver according to a third modification.

FIG. 5 is a block diagram illustrating an example of the configuration of a receiver according to a third modification. The receiver of FIG. 5 corresponds to the combination of the first embodiment and the first modification. Specifically, the CRC sections 90-1 and 90-2 are provided for the decoders 50-1 and 50-2, respectively, and likelihood information obtained by the decoders 50-1 and 50-2 and results of CRC obtained by the CRC sections 90-1 and 90-2 are used for the comparison by the comparator 60.

On the basis of the likelihood information and the results of CRC, the comparator 60 determines (selects) one of the results of decoding that is likely to be the received signal and the frequency offset ($\phi$ or $\psi$) that provides the determined result of decoding, and controls the selectors 70 and 80 in accordance with the determination.

Figure 6:
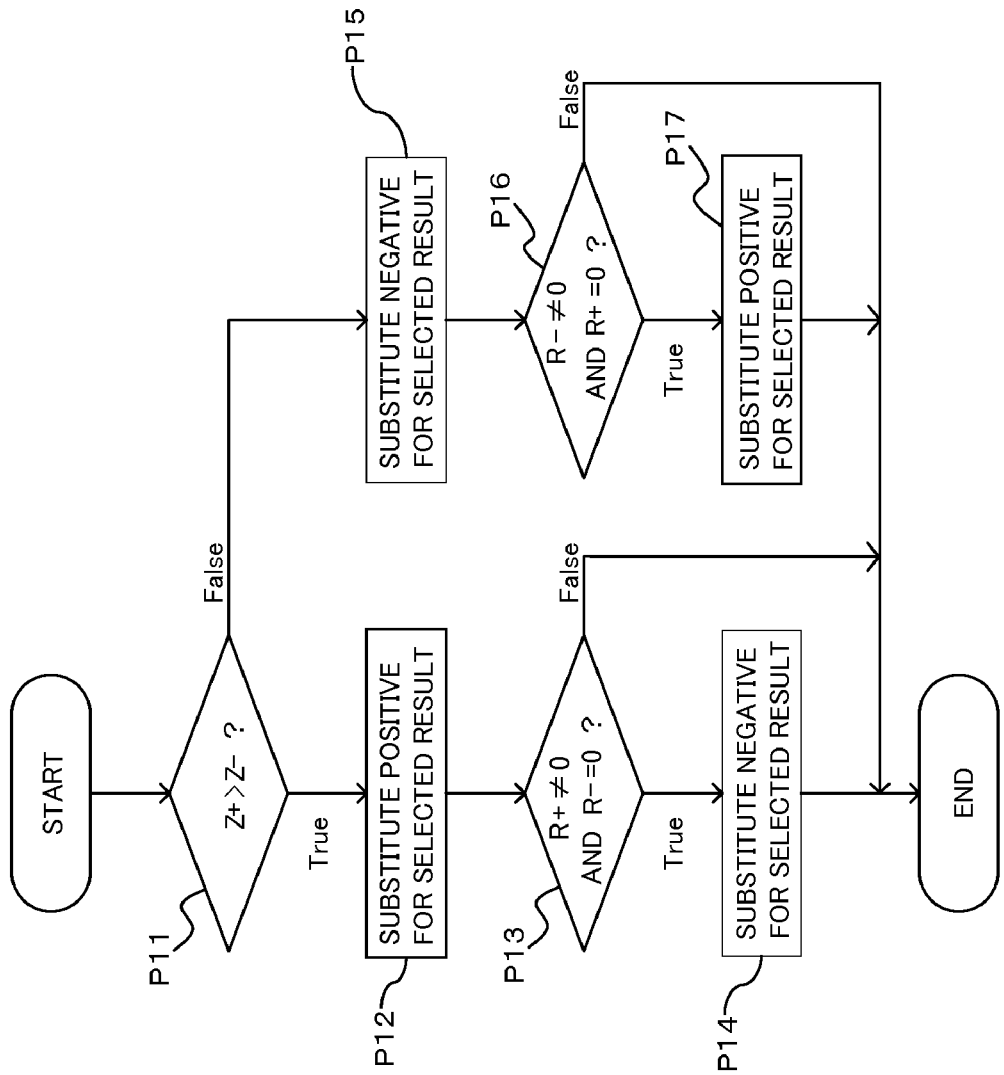
FIG. 6 A flow diagram illustrating an example of a succession of procedural steps of operation performed in the receiver of FIG. 5.

FIG. 6 illustrates an example of an algorithm of the determination by the comparator 60. In FIG. 6, "Z+" represents a likelihood (positive) of decoding obtained by the decoder 50-1; "Z−" represents a likelihood (negative) of decoding obtained by the other decoder 50-2; "R+" represents the result (positive) of CRC carried out by the CRC section 90-1; and "R−" represents the result (negative) of CRC carried out by the other CRC section 90-2.

As illustrated in FIG. 6, the comparator 60 compares the likelihood of decoding by the decoder 50-1 and that by the decoder 50-2 to judge whether Condition 1 of Z+>Z− is satisfied (step P11). If the result of comparison satisfies Condition 1 (True route), the comparator 60 provisionally selects the result of decoding and a frequency offset that provide the likelihood (positive) of decoding as the results of selection (step P12).

Then the comparator 60 judges whether Condition 2 of both R+≠0 and R−=0 is satisfied (step P13). If the result of judgment satisfies Condition 2 (True route), the comparator 60 reselects a result of decoding and a frequency offset that provide the likelihood (negative) of decoding as the results of selection (step P14) on the ground of the judgment that the sign of the likelihood of decoding is inverted due to noise or other reason.

Conversely, if Condition 2 is not satisfied (False route), the comparator 60 enables the result of decoding and the frequency offset provisionally selected in step P12.

If the result of comparison between likelihoods of decoding by the decoder 50-1 and that by the decoder 50-2 does not satisfy Condition 1 (False route of step P11), the comparator 60 provisionally selects a result of decoding and a frequency offset that provide the likelihood (negative) of decoding as the results of selection (step P15).

Then the comparator 60 judges whether Condition 3 of both R−≠0 and R+=0 is satisfied (step P16). If the result of judgment satisfies Condition 3 (True route), the comparator 60 reselects a result of decoding and a frequency offset that provide the likelihood (positive) of decoding as the results of selection (step P17) on the ground of the judgment that the sign of the likelihood of decoding is inverted due to noise or other reason. Conversely, if Condition 3 is not satisfied (False route), the comparator 60 enables the result of decoding and the frequency offset provisionally selected in step P15.

Selecting a result of decoding and a frequency offset on the basis of likelihood of decoding and a result of CRC can obtain the correct result of estimating a frequency offset in a range where a result of CRC is reliable even when the sign of the likelihood of decoding is inverted due to noise or other reason.

(5) Fourth Modification

In some cases where, for example, the mobile terminal travels at a low speed, the result (phase rotation $\phi$) of estimating by the frequency offset estimating section 10-1 does not exceed 180°. In such a case, a received data signal may be sufficiently subjected to compensation for a frequency offset, demodulation, and decoding through the use of only a result $\phi$ of estimating by the frequency offset estimating section 10-1 (hereinafter these processes are called, the first procedure). In other words, the series of processing (hereinafter called the second procedure) including compensation for a frequency offset, demodulation, and decoding through the use of a result of calculated by the reverse phase calculator 10-2 may be omitted.

Figure 7:
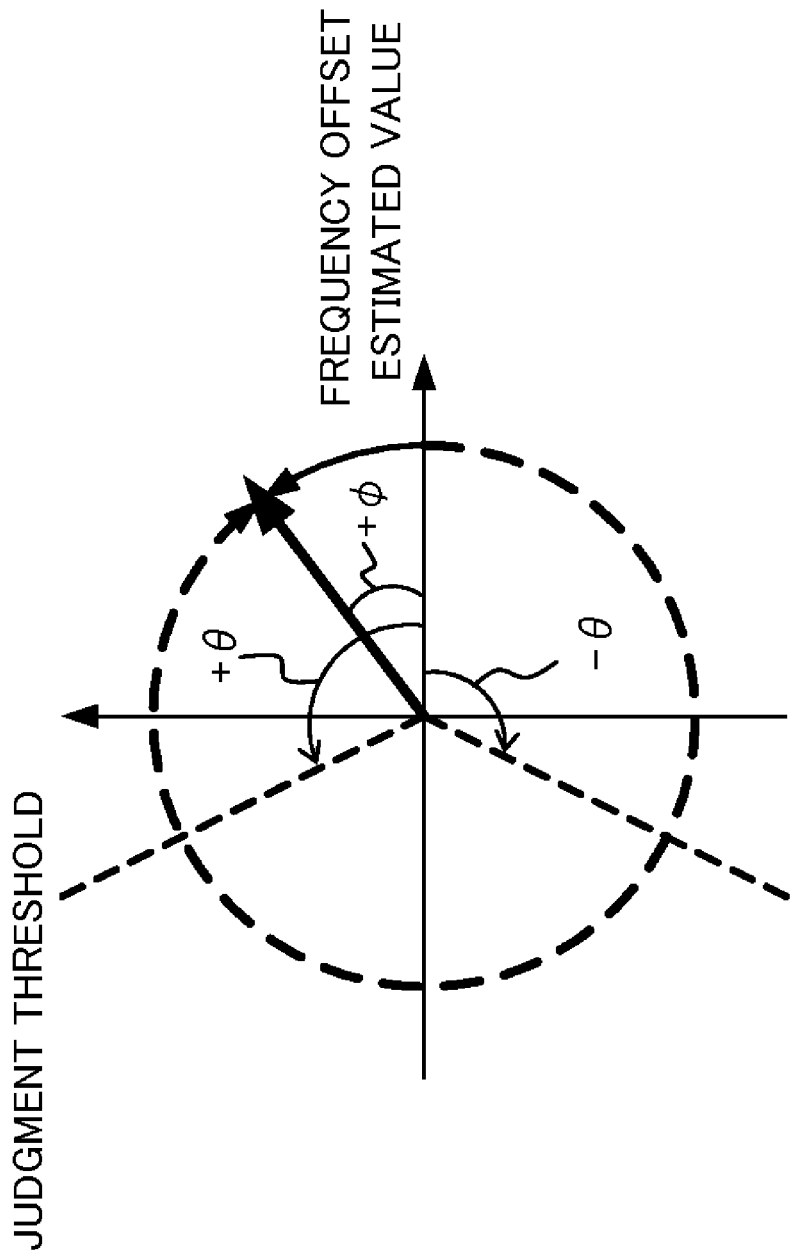
FIG. 7 A diagram illustrating an image of estimating a frequency offset of a receiver according to a fourth modification.
Figure 8:
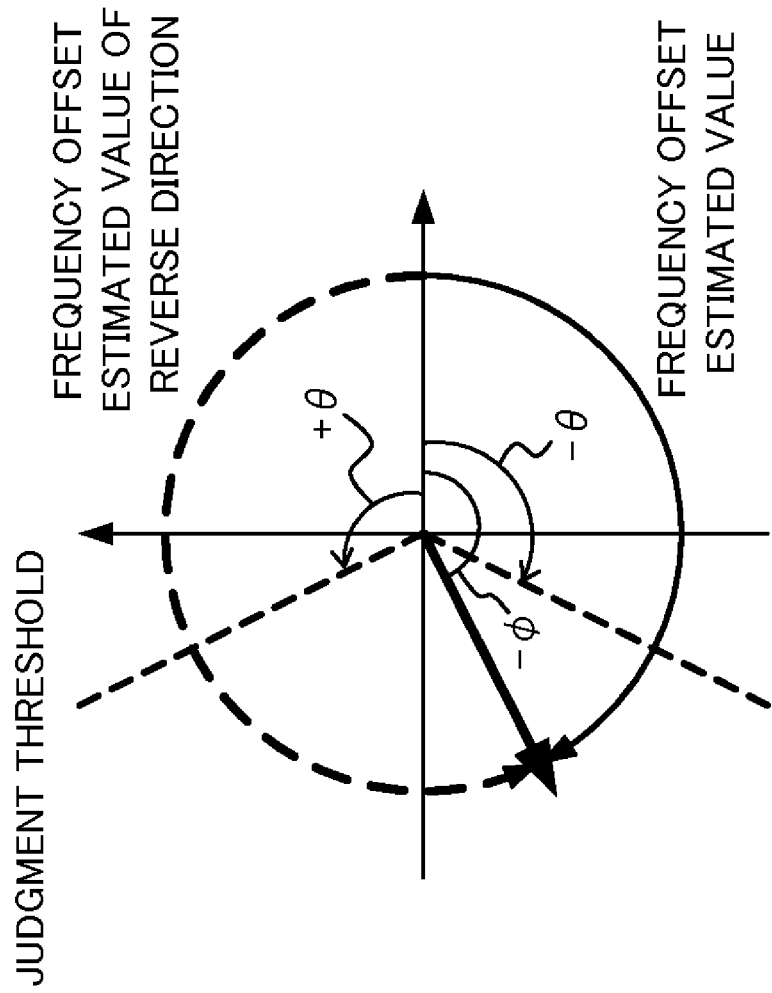
FIG. 8 A diagram illustrating an image of estimating a frequency offset of a receiver of the fourth modification.

As illustrated in FIGS. 7 and 8, a predetermined judgment threshold θ is set for the absolute value of an estimated frequency offset (phase offset φ). Then, as illustrated in FIG. 8, if the estimated phase offset φ exceeds the judgment threshold θ, both first procedure and the second procedure are carried out. In contrast, if the estimated phase offset φ is the judgment threshold θ or less, only the first procedure is carried out, but the second procedure is not carried out. The judgment threshold θ may be in a range of, for example, 90°<θ<180° as illustrated in FIGS. 7 and 8, but the threshold is not limited to a value within this range.

Figure 9:
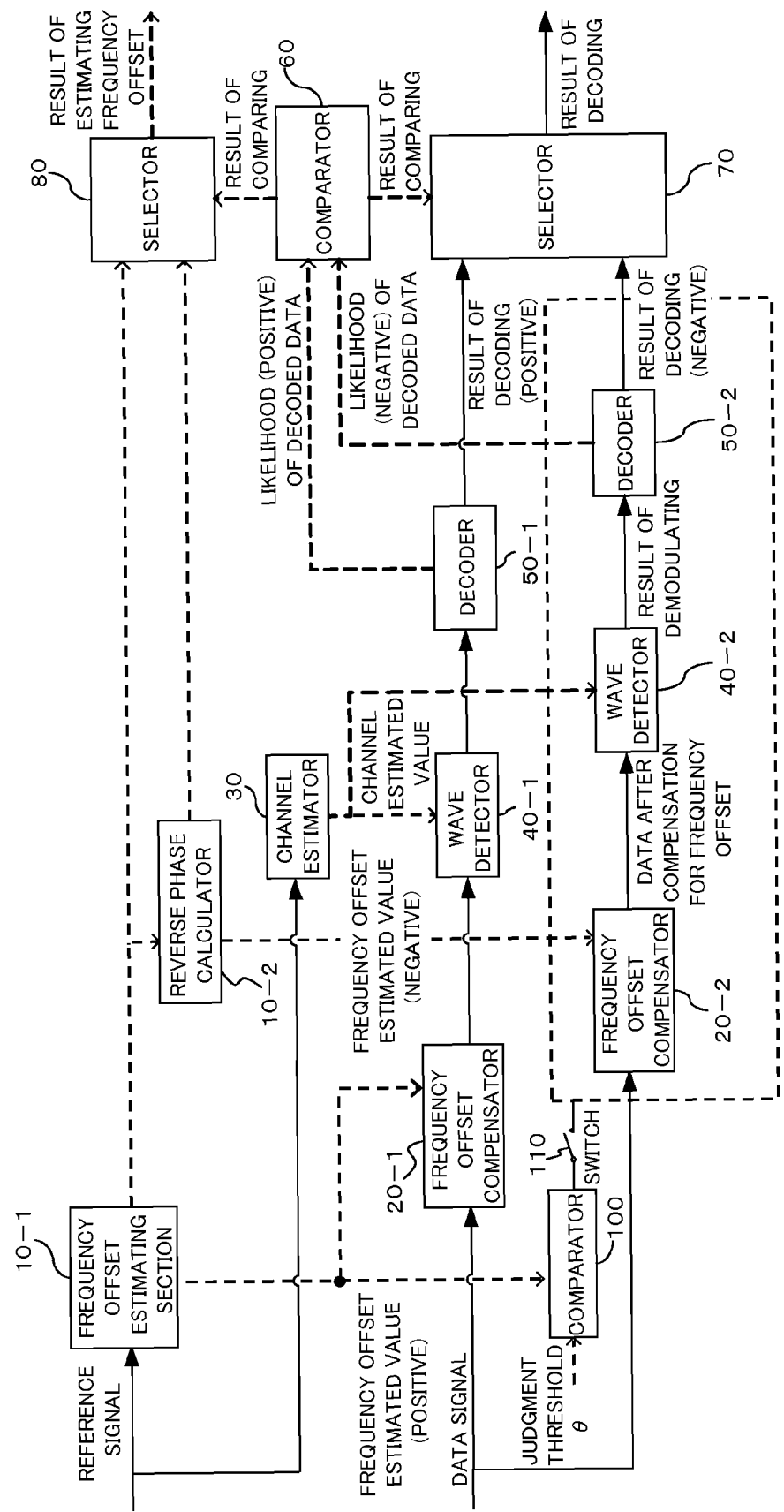
FIG. 9 A block diagram schematically illustrating an example of the configuration of a receiver according to the fourth modification.

FIG. 9 illustrates an example of the configuration that enables the above selective processing through threshold judgment. FIG. 9 is an example of the configuration in which the first procedure and the second procedure are performed in parallel with each other. Specifically, the receiver is equipped with the frequency offset compensator 20-1, the wave detector 40-1, and the decoder 50-1, which carry out the first procedure, and the frequency offset compensator 20-2, the wave detector 40-2, and the decoder 50-2, which carry out the second procedure.

In addition to the above elements, the receiver further includes a comparator 100 which carries out the threshold judgment, and a switch 110 which disables the second procedure (i.e., the operation of the frequency offset compensator 20-2, the wave detector 40-2, and the decoder 50-2) in accordance with the result of comparing (judging) of the comparator 100.

In detail, the comparator (controller) 100 compares the estimated phase offset φ obtained by the frequency offset estimating section 10-1 with the judgment threshold θ (threshold judgment), and, if the result of the comparison is φ>θ, turns on the switch 110. Thereby, both the first procedure and the second procedure are carried out, so that the likelihoods obtained by both decoders 50-1 and 50-2 are provided to the comparator 60, which controls the selectors 70 and 80 the same as the above.

In contrast, if the result of the comparison is φ≦θ, the comparator 100 turns off the switch 110. Thereby, the second procedure is disabled (not carried out), so that only the likelihood obtained through the first procedure (i.e., the likelihood obtained by the decoder 50-1) is provided to the comparator 60. Accordingly, the comparator 60 controls the selectors 70 and 80 such that the frequency offset (i.e., the output of the frequency offset estimating section 10-1) corresponding to the first procedure and the result of decoding by the decoder 50-1 are output.

According to the fourth modification, the first procedure is carried out but the second procedure is not carried out if the estimated phase offset φ obtained by the frequency offset estimating section 10-1 does not exceed the judgment threshold θ. This makes it possible to reduce the amounts of processing and consumption electric power for a mobile station (user) traveling at a low speed. Although the configuration of the fourth modification narrows the range of estimatable frequency offset by θ, the amount of processing for each individual user can be reduced. With this configuration, if the ratio of calling by users traveling at low speed is high, the efficiency of accommodating users can be improved.

Alternatively, the comparator 100 may disable the reverse phase offset calculator 10-2, the frequency offset compensator 20-2, the wave detector 40-2, and the decoder 50-2 upon the switch 110 is turned off or irrespective the ON/OFF state of the switch 110. That can reduce the consumption of electric power of the receiver.

The fourth modification assumes that the first procedure and the second procedure are carried out in parallel with each other. Alternatively, the first procedure and the second procedure are time-divisionally carried out (i.e., time shared manner) through the use of a frequency offset compensator, the wave detector, and the decoder each common to the two procedures.

(6) Fifth Modification

Figure 10:
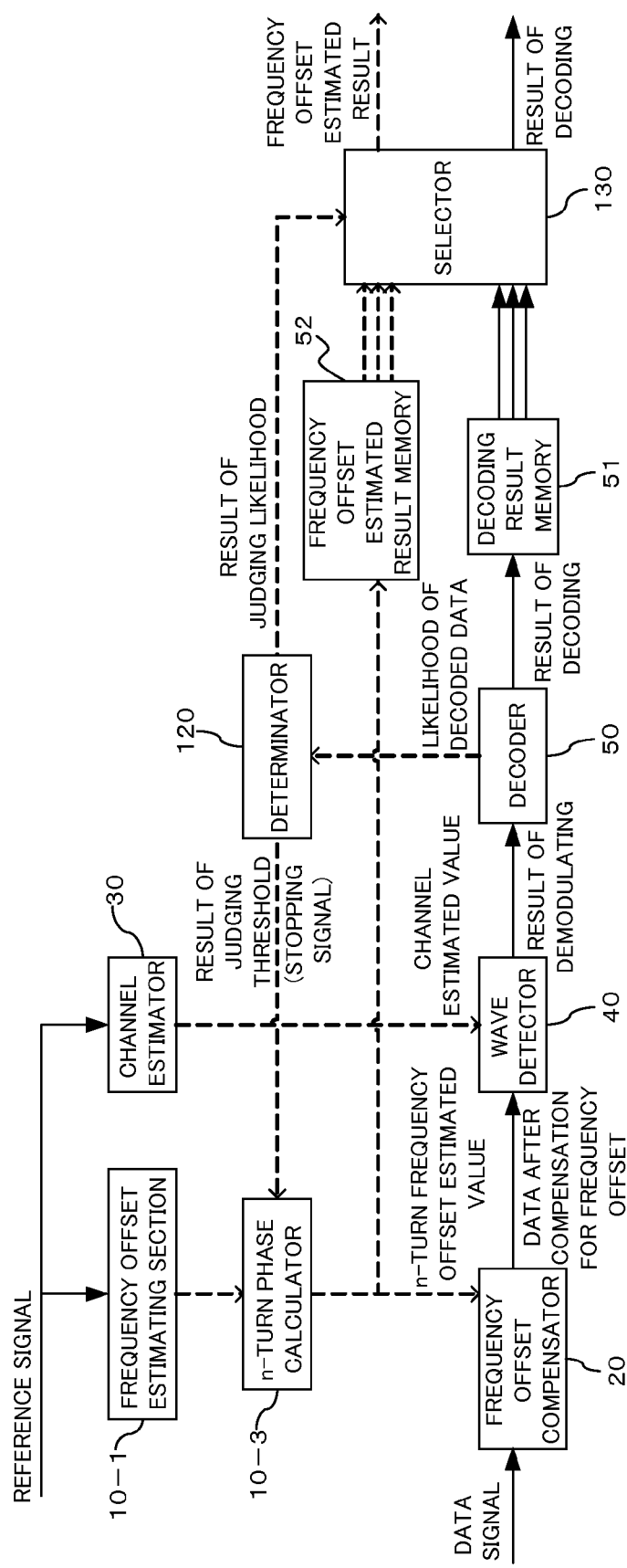
FIG. 10 A block diagram schematically illustrating an example of the configuration of a receiver according to a fifth modification.

FIG. 10 is a block diagram schematically illustrating an example of the configuration of a receiver according to the fifth modification. The receiver illustrated in FIG. 10 can deal with a frequency offset having a phase offset φ exceeding one turn (i.e., 360°). The receiver of FIG. 10 exemplary includes the frequency offset estimating section 10-1, an n-turn phase calculator 10-3, a frequency offset compensator 20, a channel estimator 30, a wave detector 40, a decoder 50, a decoding result memory 51, a frequency offset estimated result memory 52, a determinator 120, and a selector 130.

The frequency offset estimating section 10-1 is the same or substantially the same as the above.

The n-turn phase calculator 10-3 generalizes Formula (1) into Formula (2) below and thereby makes it possible to estimate a phase offset exceeding the range of ±360° on the basis of the estimated phase offset (φ) obtained by frequency offset estimating section 10-1.

$$\psi(n)=\phi-2\pi n \times sgn(\phi), \text{ (where, } n=0, \pm 1, \pm 2, \ldots) \quad (2)$$

For example, when there is need to estimate a frequency offset in a range of ±720°, the coefficient n is set to be n=0, 1, −1, 2, resulting in obtaining four calculated phase offsets.

In the fifth modification, the combination of the frequency offset estimating section 10-1 and the n-turn phase calculator 10-3 serves as phase offset estimating section that estimates a phase offset of a received signal and that calculates one or more phase offsets which result in the estimated phase offset and which have different phase rotation directions and/or different amounts of phase rotation from one another. Here, if the coefficient n is set to be n=0, 1, the calculated phase offsets correspond to a phase offset obtained by the frequency offset estimating section 10-1 and that obtained by the reverse phase calculator 10-2.

Setting the coefficient n in accordance with the range of estimating a phase offset results in a number of calculated frequency offsets ψ(n) as many as the number of coefficients n. For example, such calculated phase offsets are time-divisionally provided to the frequency offset compensator 20 (in time series), and are stored in, for example, the frequency offset estimated result memory 52.

The frequency offset compensator 20 compensate for each calculated frequency offset of the received signal which offset is provided from the n-turn phase calculator 10-3.

The channel estimator 30 estimates a transmission path (i.e., channel) response between the receiver itself and the transmitted on the basis of the received reference signal. The obtained channel estimated value is sent to the wave detector 40.

The wave detector 40 detects (demodulates) the received data signal subjected to compensation for each frequency offset ψ(n) by the frequency offset compensator 20 on the basis of the channel estimated value provided from the channel estimator 30. The results of demodulating by the wave detector 40 are sent to the decoder 50.

The decoder 50 decodes each result of demodulating. The decoder 50 can be realized by an error correction decoder. The decoder 50 calculates the likelihood information of each result of decoding (likelihood of decoded data). An example of applicable error correction code is turbo code. The results of decoding by the decoder 50 are stored in the decoding result memory 51.

In the fifth modification, the frequency offset compensator 20, the wave detector 40, and the decoder 50 are shared by a number of frequency offsets calculated by the n-turn phase calculator 10-3, and with this configuration, a series of processing of compensation for a frequency offset, demodulation, and decoding is time-divisionally carried out for each individual calculated frequency offset. The results of decoding by the decoder 50 are stored in the decoding result memory 51, and the respective calculated frequency offsets used in the time-divisional processing are stored in the frequency offset estimated result memory 52.

The determinator 120 compares the likelihoods of decoding by the decoder 50 obtained during the time-divisional processing, and determines (selects) a likelihood (maximum value) that provides the most likely result of decoding among the compared likelihoods. The result of determining is provided to the selector 130, which reads and outputs the calculated frequency offset and the result of decoding which are corresponding to the determined likelihood from the frequency offset estimated result memory 52 and the decoding result memory 51, respectively.

Alternatively, the determinator 120 may judge whether each likelihood of decoding by the decoder 50 obtained during the time-divisional processing exceeds a predetermined threshold (likelihood judgment threshold) $\Theta$. For example, the threshold $\Theta$ is set to be a value afford to provide a correct result of decoding. If the result of judging concludes the likelihood of decoding corresponding to one of the calculated frequency offsets $\psi(n)$ is the threshold $\Theta$ or lower, the determinator 120 instructs the n-turn phase calculator 10-3 to output another calculated frequency offset $\psi(n)$ to the frequency offset compensator 20.

In contrast, if the result of judging concludes the likelihood of decoding corresponding to one of the calculated frequency offsets $\psi(n)$ exceeds the threshold $\Theta$, the determinator (controller) 120 instructs the n-turn phase calculator 10-3 to stop subsequent outputting of another calculated frequency offset $\psi(n)$ to the frequency offset compensator 20. Namely, upon obtaining likelihood of decoding which can afford to provide a correct result of decoding, the subsequent processing of compensation for a frequency offset, demodulation and decoding is not required. For this purpose, the n-turn phase calculator 10-3, the frequency offset compensator 20, the wave detector 40, and the decoder 50 may be disabled.

The number of times of performing a series of processing including compensation for a frequency offset, demodulation, and decoding increases as increase in the number of coefficient n that means expanding the range of estimating frequency offsets. Even in this case, the amount of processing and consumption electric power can be saved by stopping the processing upon judging that the likelihood of decoding corresponding to one of the calculated frequency offsets $\psi(n)$ exceeds the threshold $\Theta$ as the above.

Figure 11:
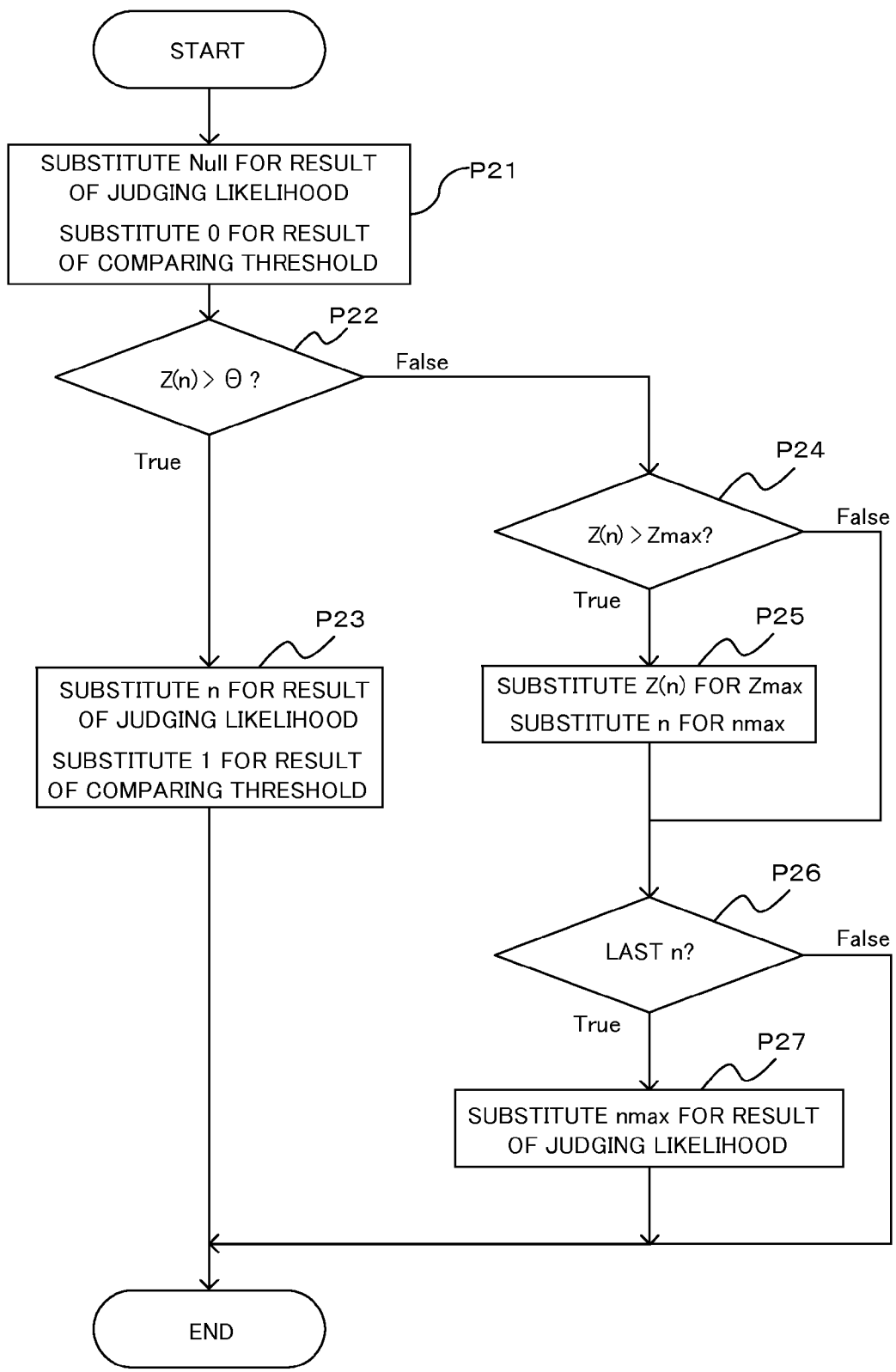
FIG. 11 A flow diagram illustrating an example of a succession of procedural steps of operation performed in the receiver of FIG. 10.

The detailed example of processing will now be described with reference to FIG. 11. In FIG. 11, Z(n) represents the likelihood of decoding corresponding to a frequency offset $\psi(n)$ derived by Formula (2); Zmax represents the maximum likelihood of decoding; and nmax represents the coefficient n corresponding to the maximum likelihood Zmax of decoding.

First of all, the determinator 120 sets the initial values of the result of judging the likelihood and the result of comparing with the threshold value to be NULL and 0, respectively (initialization step P21). The result of judging the likelihood is ultimately provided to the selector 130 and used for selecting a result of decoding and a corresponding frequency offset. The result of comparing with the threshold is ultimately provided to the n-turn phase calculator 10-3. The result of judging with the threshold equals to 1 exemplary represents the stopping signal to stop the subsequent processing as the above.

After that, the determinator 120 compares the likelihood Z(n) of decoding by the decoder 50 in association with the frequency offset $\psi(n)$ derived from Formula (2) with the likelihood judgment threshold $\Theta$ to judge whether the relationship of Z(n)>$\Theta$ is satisfied (step P22).

If the relationship of Z(n)>$\Theta$ is not satisfied (False route of step P22), the determinator 120 further judges whether the relationship of Z(n)>Zmax is satisfied (step P24).

If the relationship of Z(n)>Zmax is satisfied (True route of step P24), the determinator 120 substitutes Z(n) for Zmax and substitutes n for nmax (step P25). Conversely, if the relationship of Z(n)>Zmax is not satisfied (False route of step P24), the determinator 120 proceeds to step P26.

In the step P26, the determinator 120 judges whether the current n is the last. If the current n is the last (True route of step P26), the determinator 120 sets the result of judging the likelihood to be nmax and finishes the procedure. If the current n is not the last (False of step P26), the determinator 120 finishes the procedure.

If the relationship of Z(n)>$\Theta$ is satisfied in step P22 (True route in step P22), the determinator 120 sets the result of judging the likelihood to be n, sets the result of comparing with the threshold to be 1 (step P23), and finishes the procedure.

As described above, the fifth modification can estimate a phase offset even when a phase offset exceeding 360° occurs between the received reference signals. Thereby, the range of an estimatable phase offset can be more than twice the conventional range. Accordingly, even when the received signal has a phase offset exceeding ±360°, the received signal can be properly demodulated and decoded.

The fifth modification assumes that the frequency offset compensator 20, the wave detector 40, and the decoder 50 are common to the results of calculating frequency offsets by the n-turn phase calculator 10-3. Alternatively, the frequency offset compensator 20, the wave detector 40, and the decoder 50 may be provided for each calculated frequency offset. In this case, it is satisfactory to stop processing on calculated frequency offsets corresponding to likelihoods of decoding except for the likelihood exceeding the threshold $\Theta$.

(7) Sixth Modification

The method of estimating a frequency offset of the above receiver may be applied to part of channels.

For example, assuming that the receiver deals with a first channel and a second channel and that the second channel transmits data having a longer code length than data transmitted through the first channel, a result of estimation by the frequency offset estimating section 10-1 is applied to data having a shorter code length received through the first channel while a result of estimation by the reverse phase calculator 10-2 is applied to data having a longer code length received through the second channel.

This configuration makes it possible to apply a frequency offset calculated on the basis of the first channel to a second channel, which requires high processing cost due to a long code length. Accordingly, efficiency receiving processing (compensation for a frequency offset, demodulation, and decoding) can be carried out in accordance with the channel importance and other factors.

Figure 12:
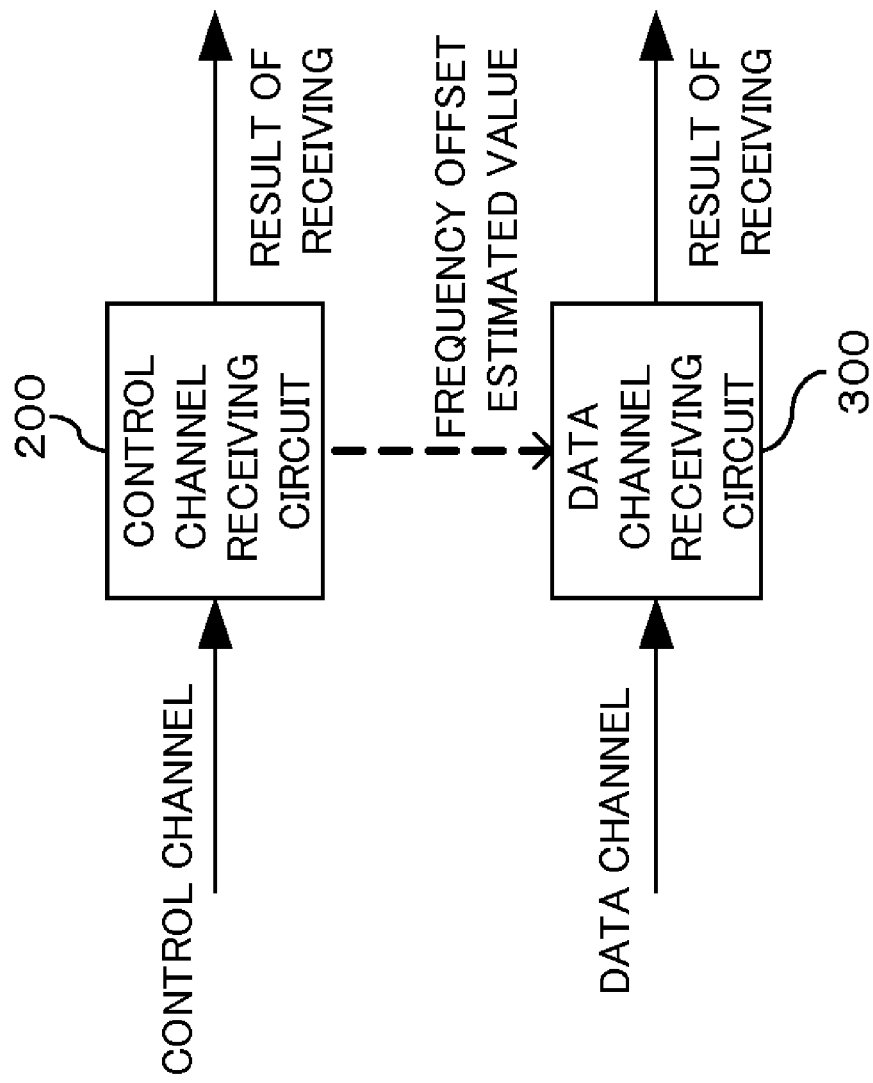
FIG. 12 A block diagram schematically illustrating an example of the configuration of a receiver according to a sixth modification.

FIG. 12 illustrates an example of the configuration in which the first channel is a control channel and the second channel is data channel. The receiver illustrated in FIG. 12 includes a control channel receiving circuit 200 that processes signals (data signals) received through the control channel and a data channel receiving circuit 300 that processes signals (data signals) received through the data channel.

The control channel receiving circuit 200 has the configuration of the receiver of the first embodiment and the modifications. Specifically, the control channel receiving circuit 200 estimates a frequency offset in the above manner, regarding a signal of the control channel as a received data signal and selects one of estimated or calculated frequency offsets that provides the decoding result the most likely to be a correct received signal in the selector 80 (or 130).

Figure 13:
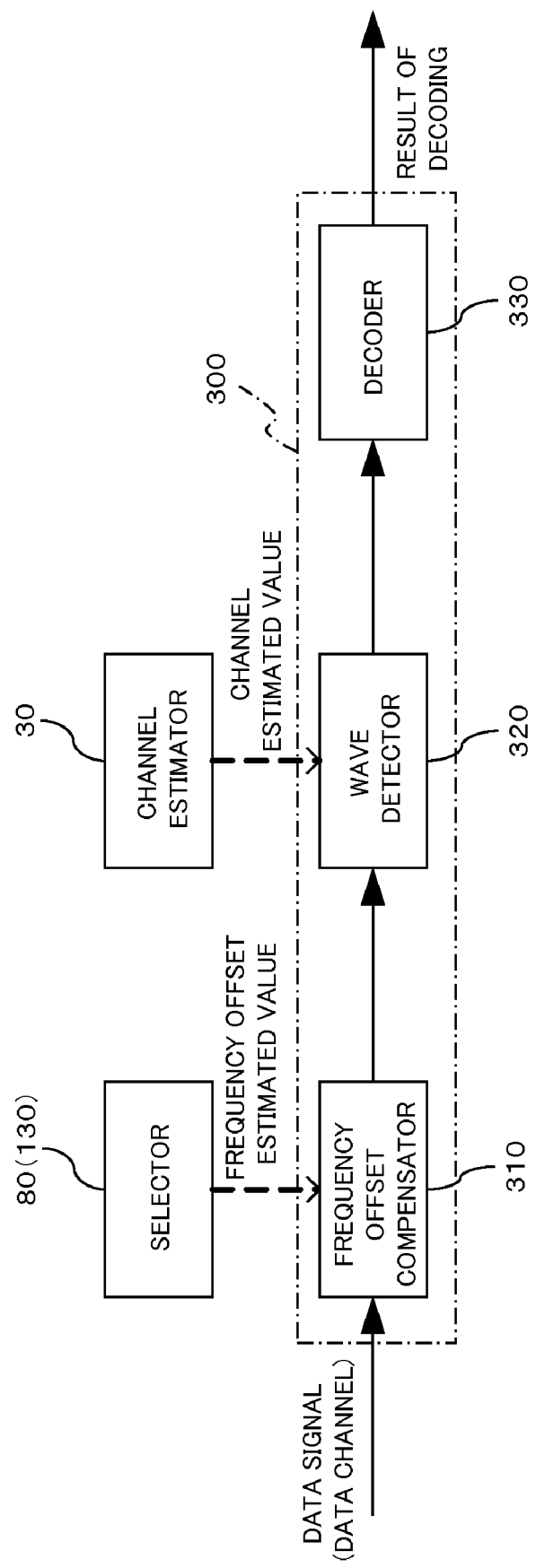
FIG. 13 A block diagram illustrating an example of the configuration of a data channel receiving circuit of FIG. 12.
Figure 14:
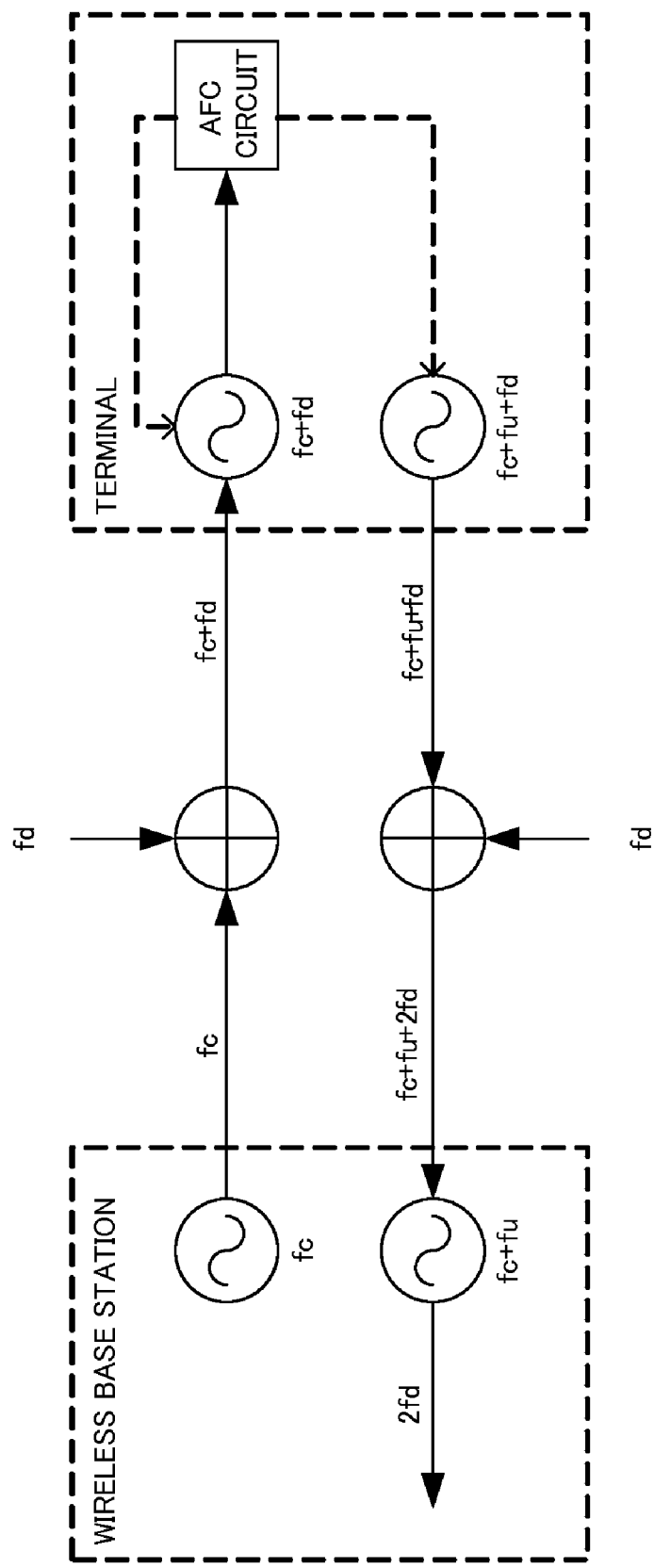
FIG. 14 A diagram illustrating effects caused by Doppler shift at a base station.
Figure 15:
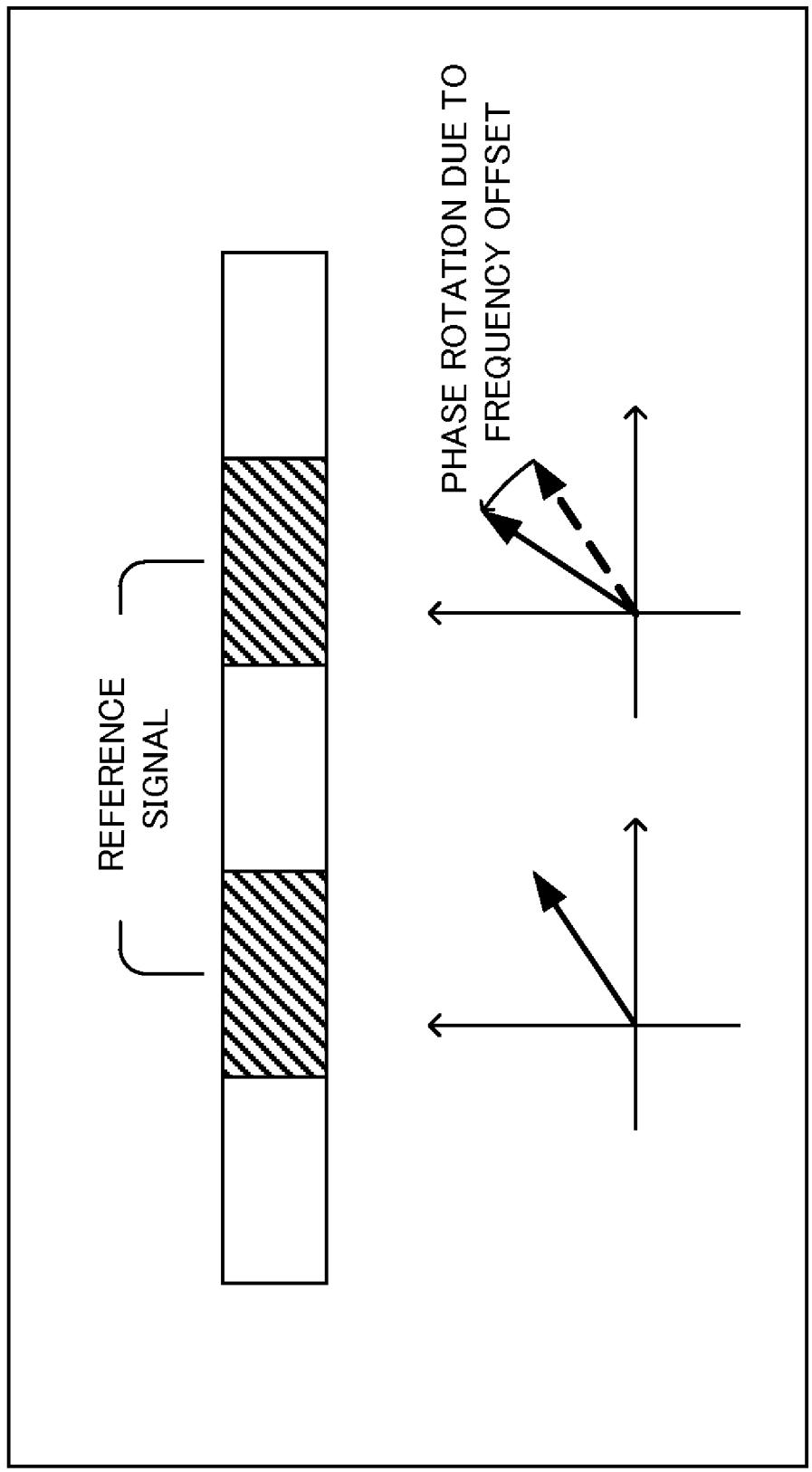
FIG. 15 A diagram illustrating a method for estimating a frequency (phase) offset through the use of reference signals.

On the other hand, the data channel receiving circuit 300 includes, as illustrated in FIG. 13, a frequency offset compensator 310, a wave detector (demodulator) 320, and a decoder 330.

The frequency offset compensator 310 compensates for a frequency offset of data signals received through the data channel, using the result of estimating or calculating frequency offset selected in the selector 80 (or 130).

The wave detector 320 detects (demodulates) signals of the received data channel, whose frequency offset is compensated in the frequency offset compensator 310, on the basis of the channel estimated value obtained by the channel estimator 30.

The wave detector 330 decodes the modulated received data channel signal. The wave detector 330 can be an error correction decoder.

According to the first The range of an estimatable frequency (phase) offset can be enlarged irrespective of the cycle of transmitting a known signal, such as a pilot signal or a reference signal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. A receiver comprising:
   a phase offset estimating section that estimates a phase offset of a received signal and that calculates one or more phase offsets which result in the estimated phase offset of the received signal and which have different phase rotation directions and/or different amounts of phase rotation from one another;
   a receiving processing section that compensates for the phase offset of the received signal, using each of a plurality of phase offsets that are the estimated phase offset and the calculated phase offsets, and that demodulates and decodes the plurality of compensated received signals; and
   a decoding result selecting section that selects a decoding result that is the most likely to be the received signal among a plurality of results of the decoding corresponding one for each of the plurality of phase offsets.

2. The receiver according to claim 1, wherein the phase offset estimating section calculates the plurality of phase offsets $\psi(n)$ from Formula (2)

$$\psi(n)=\phi-2\pi n \times sgn(\phi) \qquad (2)$$

(where, $\phi$ represents the estimated phase offset; n=0, ±1, ±2, . . . ; and when $\phi \geq 0$, $sgn(\phi)=1$, when $\phi<0$, $sgn(\phi)=-1$).

3. The receiver according to claim 1, wherein the decoding result selecting section determines the decoding result that is the most likely to be the received signal on the basis of likelihood information obtained through the decoding.

4. The receiver according to claim 1, wherein the decoding result selecting section determines the decoding result that is the most likely to be the received signal on the basis of results of CRC performed on the plurality of results of the decoding.

5. The receiver according to claim 1, further comprising a controller that stops, if the estimated phase offset does not exceed a predetermined threshold, the compensating, the demodulating, and the decoding of the plurality of phase offsets.

6. The receiver according to claim 1, wherein the receiving processing section performs time-divisionally processing on the compensating, the demodulating, and the decoding of each of the plurality of phase offsets; and
   the receiver further comprises a controller that, if the likelihood information of the decoding obtained during the time-divisionally processing exceeds a predetermined threshold, stops the subsequent time-divisionally processing.

7. The receiver according to claim 1, wherein the received signal is received through a first channel; and
   the receiver further comprises a phase offset compensator that compensates for a phase offset of a signal received through a second channel, through which data having a longer codes than that transmitted through the first channel, using the decoding result that is the most likely to be the received signal.

8. The receiver according to claim 7, wherein the first channel is a control channel, and the second channel is a data channel.

9. A method for receiving comprising:
   estimating a phase offset of a received signal and calculating one or more phase offsets which result in the estimated phase offset of the received signal and which have different phase rotation directions and/or different phase rotation amounts from one another;
   compensating for the phase offset of the received signal, using each of a plurality of phase offsets that are the estimated phase offset and the calculated phase offsets, and demodulating and decoding the plurality of compensated received signals; and
   selecting a decoding result that is the most likely to be the received signal among a plurality of results of the decoding corresponding one for each of the plurality of phase offsets.

* * * * *